United States Patent Office 2,981,676
Patented Apr. 25, 1961

2,981,676
PROCESS FOR REVIVIFYING CONTAMINATED CRACKING CATALYSTS

Clark Edward Adams, Leslie Mandeville Addison, and Warren Maxwell Smith, Baton Rouge, La., assignors to Esso Research and Engineering Company, a corporation of Delaware No Drawing. Filed May 1, 1956, Ser. No. 581,836

17 Claims. (Cl. 208—120)

This invention relates to treating catalysts and more particularly relates to treating cracking catalysts which have become contaminated in use.

In the catalytic cracking of hydrocarbons it is known that the catalyst such as silica-alumina, silica-magnesia, silica-alumina-magnesia, silica-alumina-zirconia, etc. loses activity and selectivity during use partly because of the high temperatures encountered in the cracking operation and the regeneration step. There is also a loss of activity and selectivity of the catalyst due to catalyst contamination by contaminating materials in the gas oil feed. Metallic contaminants such as compounds of nickel, vanadium and iron occur in some gas oil feed stocks and during the cracking operation the contaminants are laid down on the catalysts and even though they are present in only small amounts in the gas oil feed, the contaminants accumulate on the catalyst and cause degradation of the gas oil feed to hydrogen and carbon so that less gasoline is formed and more undesirable products are formed.

Various methods have been suggested for revivifying cracking catalysts which have become contaminated with compounds of nickel, vanadium, and iron but none of these methods have proved successful. In the prior art hydrogen fluoride has been used to revivify cracking catalysts and while this treatment showed some improvement in catalyst activity and selectivity at first, the effect was not lasting and the process was given up. Other chemical treatments have been suggested but none have been commercially successful even though the contamination problem still exists.

In the conventional catalytic cracking processes, the temperature during cracking is between about 850° F. and 1000° F. and the temperature during regeneration is betweeen about 900° F. and 1150° F. It is known that steaming a catalyst at relatively high temperatures reduces catalyst activity and some deactivation of the catalyst occurs by contact with steam in the cracking unit especially during regeneration when temperatures up to about 1150° F. are conventional. It has also been noted in the prior art that high temperatures in the regenerator are to be avoided, as such high temperatures above about 1150° F. are detrimental to the catalyst due to high steam partial pressures and may lead to temperature runaways of the catalyst due to afterburning of CO with a consequent degradation in surface area.

According to the present invention and contrary to the prior art teachings it has been found that a contaminated cracking catalyst can have its activity and selectivity improved by treatment at a relatively high temperature in the range between about 1250° F. and 1750° F. for about 1 to 3 hours. To get the improved and unexpected results of the present invention, it is necessary to have a small amount of alkali or alkaline earth metal oxide such as $Na_2O$, $CaO$, etc. present on the catalyst, preferably between about 0.05% and 0.5% by weight. It is known that normally the silica-alumina cracking catalyst made from sulfuric acid and sodium silicate as starting products contains some sodium oxide but this is usually below about 0.05% by weight. When there is less than about 0.05% $Na_2O$ or other alkali or alkaline earth metal oxide by weight on the catalyst, it is necessary to add a small amount of $Na_2O$ or other alkali metal oxide to bring the amount of $Na_2O$ or the like into the range between about 0.05 and 0.5% by weight.

Alkali concentrations above about 0.5 wt. percent are known to adversely affect the activity and selectivity of cracking catalysts so control of the alkali content is critical in order to have sufficient alkali present to effect the improvement of this invention but not too much alkali so that the activity and selectivity of the catalyst are degraded from the alkali present. The alkali metal oxide can be added to the catalyst in any form which on heating in the presence of air will give the oxide, as for example, as an hydroxide, carbonate, nitrate, acetate, oleate, etc. Even distribution throughout the catalyst is preferred as obtained, for example, by impregnation from solution, spraying and mulling, or by addition as an oil soluble compound with the cracking feed.

According to the present invention the catalyst to be treated is preferably regenerated to remove coke or carbon and is then heated preferably in the substantial absence of steam, as steam is known to deactivate the catalyst as above mentioned. The treated and reactivated catalyst is then returned to the cracking unit. The catalyst may be any conventional synthetically prepared cracking catalyst but silica-alumina catalyst is preferred which contains a major portion of silica with 13% to 50% by weight of alumina. In cases where the synthetic catalyst contains no alkali or alkaline earth metal oxide or an amount below about 0.05% by weight, it is necessary to add some alkali or alkaline earth metal oxide to the catalyst as above mentioned. The catalyst may be in the form of finely divided particles for use as fluidized solids or it may be in the form of larger size pellets suitable for use in a fixed bed or moving bed catalytic cracking process. The finely divided catalyst for fluid operation comprises particles mostly between 20 and 80 microns with some particles being smaller and some larger but with about 95% of the solids passing through 100 mesh standard screen.

In a specific example, contaminated cracking catalyst was taken from a commercial powdered catalyst cracking unit which was cracking gas oil with the production of abnormal amounts of hydrogen and carbon. Where normally about 25 cubic feet of hydrogen per barrel of gas oil feed are produced with the equilibrium cracking catalyst, with the contaminated catalyst (synthetic silica-alumina containing 13% alumina) about 160 cubic feet of hydrogen per barrel of gas oil feed were produced. Equilibrium cracking catalyst is briefly defined as cracking catalyst which has been in a cracking unit for a sufficient time under unit conditions and feeds so that its properties are not changing with a constant rate of catalyst addition and loss.

EXAMPLE 1

The contaminated silica-alumina catalyst taken from a commercial powdered catalyst cracking unit contained about 0.017% by weight of nickel. This catalyst was taken from the unit during high hydrogen production in cracking gas oil and so was definitely contaminated. The contaminated catalyst contained about 0.07 wt. percent $Na_2O$. A portion of the contaminated catalyst was placed in a porcelain dish and put in a muffle furnace where it was initially heated at about 1000° F. in the presence of air for about 15 hours or overnight to remove any carbonaceous deposits and moisture. Thereafter, the heated catalyst was heated at 1500° F. in the substantial absence of steam for about 3 hours. The catalyst was then tested for the catalytic cracking activity and selectivity under standard conditions in a fluid bed with East Texas light gas oil feed, atmospheric pressure, 40 mol. percent steam diluent, a temperature of about 955–960° F. and five-minute cracking cycle. The results are compared to normal equilibrium catalyst in Table 1. In the following Table 1, w./hr./w. is weight of oil per hour per weight of catalyst. The data obtained are expressed as a percentage of the values that would be expected with fresh synthetic silica-alumina cracking catalyst at the same conversion level. The values for fresh catalyst are read from correlations and on this basis variations in conversion level are compensated for so that direct comparison is possible as if the same conversion level was obtained.

Table 1

|  | Normal Equilibrium Catalyst | Contaminated Catalyst Heated 16 Hrs. at 1,000° F. | Contaminated Catalyst Heated 3 Hours at 1,500° F. |
| --- | --- | --- | --- |
| Feed Rate, w./hr./w. | 5.63 | 5.69 | 5.54 |
| Conversion, Vol. Percent [1] | 22.0 | 23.8 | 24.4 |
| Relative Activity Fresh Catalyst=100 | 10.0 | 11.0 | 11.3 |
| $C_4$+Gasoline, Wt. Percent | 19 | 20 | 20.2 |
| Dry Gas, Wt. Percent | 2.6 | 3.2 | 3.6 |
| CF/B | 90.0 | 148 | 134 |
| Percent Fresh Catalyst Correlation | 116 | 175 | 155 |
| $H_2$, c.f./b | 10.5 | 49.9 | 18.4 |
| Percent Fresh Catalyst Correlation | 181 | 822 | 298 |
| Carbon, Wt. Percent on Oil Feed | 0.52 | 0.80 | 0.69 |
| Percent Fresh Catalyst Correlation | 163 | 205 | 169 |

[1] 100%—Vol. Percent 430° F.+Product.

In the above Table 1 the Relative Activity is compared to fresh silica-alumina cracking catalyst (100) as a percentage. The contaminated catalyst after heating shows no degradation in activity and may even indicate an increase in activity.

From the data in Table 1 it will be seen that heat treating the contaminated catalyst for 3 hours at 1500° F. improved the selectivity of the catalyst so that the catalyst made less hydrogen and coke and approaches that for normal equilibrium catalyst.

Example 2

In another example, metal oxides were added to the contaminated cracking catalyst containing about 0.017 wt. percent of nickel above referred to. To this contaminated powdered catalyst was added by impregnation from solution in one portion 0.10 wt. percent CaO as calcium nitrate and to another portion of the contaminated catalyst 0.10 wt. percent of $Na_2O$ was added as the hydroxide. These impregnated catalysts were first heated at 1000° F. for about 16 hours to dry the catalyst under mild conditions so that heating the wet catalyst at a high emperature (high temperature steaming) would not influence the results. Data for cracking East Texas gas oil under the same conditions given in connection with Table 1 were used. Data are given in following Table 2.

Table 2

| Catalyst Impregnated to give additional Heat | 0.1% $Na_2O$ | | 0.1% CaO | |
| --- | --- | --- | --- | --- |
|  | 16 Hrs. 1,000° F. | +3 Hrs. at 1,500° F. | 16 Hrs. at 1,000° F. | +3 Hrs. at 1,500° F. |
| Feed Rate w./hr./w. | 5.56 | 5.50 | 5.53 | 5.53 |
| Conversion, Vol. Percent | 19.7 | 25.1 | 22.5 | 20.0 |
| Relative Activity Fresh Catalyst=100 | 7.0 | 11.9 | 9.4 | 7.2 |
| Yield Data: | | | | |
| $C_4$+Gasoline, Wt. Percent | 16.7 | 21.7 | 18.7 | 17.5 |
| Dry Gas, Wt. Percent | 2.7 | 3.0 | 3.0 | 2.2 |
| c.f./b | 133 | 110 | 129 | 82 |
| Percent Fresh Catalyst Correlation | 187 | 122 | 162 | 114 |
| $H_2$, c.f./b | 49.6 | 15.4 | 37 | 11.8 |
| Percent Fresh Catalyst Correlation | 907 | 248 | 630 | 211 |
| Carbon, Wt. Percent on Feed | 0.57 | 0.62 | 0.82 | 0.50 |
| Percent Fresh Catalyst Correlation | 220 | 138 | 232 | 185 |

Comparing the data in Table 2 with that in Table 1 it will be seen that the addition of alkali before heating resulted generally in selectivity improvement over heating alone.

With the present invention the cracking catalyst, when it becomes contaminated with harmful metals and deteriorates to the extent that higher amounts of hydrogen and carbon are produced than desired, can be maintained at a desired high level of cracking and activity and selectivity by withdrawing a sidestream of catalyst from the regenerator and subjecting the withdrawn catalyst to a heat treatment of between about 1250° F. and 1750° F. for about 1 to 3 hours without the use of steam and then returning the catalyst to the regeneration zone preferably in the air stream being introduced into the regenerator. The heating of the catalyst may be done in any suitable manner. For example, a fluid bed of catalyst may be maintained around tubes in which fuel is burned so that indirect heat exchange is provided. Air at a velocity of about 0.05 to 0.3 feet per second is passed up through the catalyst bed being heat treated to maintain good heat exchange. The heat treating vessel is smaller than the regenerator and may be about 1/10 to about 1/1000 the size of the regenerator. The heat treating may be done continuously or intermittently.

The claims which recite adding sodium oxide or calcium oxide or an alkali or inorganic alkaline or alkaline earth metal oxide to the contaminated cracking catalyst are to be construed as covering the addition of the oxide, as such, or as covering the addition of sodium oxide-containing compounds or calcium oxide-containing compounds which on heating in air form sodium oxide or calcium oxide, as specifically described in the sixth paragraph of the present specification and as described in Example 2 of the specification where a calcium nitrate solution was used to impregnate one portion of contaminated catalyst and sodium hydroxide was used to impregnate another portion of contaminated catalyst. In Example 2, the calculated amounts of sodium oxide and calcium oxide on the catalyst are given.

What is claimed is:

1. A process for revivifying a contaminated silica-alumina cracking catalyst which comprises heating a conventionally regenerated silica-alumina catalyst containing between about 0.05% and 0.5% by weight of an inorganic alkaline metal oxide to a temperature between about 1250° F. and 1750° F. for a time between about 1 and 3 hours in the substantial absence of steam.

2. A process for revivifying a cracking catalyst contaminated in use and containing between about 0.05% to 0.5% by weight of sodium oxide which comprises heating the contaminated catalyst in a confined zone in the substantial absence of steam for a time between about 1 and 3 hours and at a temperature between about 1250° F. and 1750° F.

3. A process according to claim 2 wherein said contaminated silica-alumina catalyst contains about 0.07% sodium oxide by weight and said contaminated catalyst is heated at about 1500° F. for about 3 hours.

4. A process for revivifying a cracking catalyst contaminated in use and containing between about 0.05% and 0.5% by weight of calcium oxide which comprises heating the contaminated catalyst in a confined zone in the substantial absence of steam for a time between about 1 and 3 hours and at a temperature between about 1250° F. and 1750° F.

5. A process according to claim 4 wherein said contaminated catalyst contains about 0.10% by weight of calcium oxide and said contaminated catalyst is heated at about 1500° F. for about 3 hours.

6. A process for revivifying a synthetic silica-alumina cracking catalyst contaminated in use which comprises heating the contaminated silica-alumina catalyst containing between about 0.05% and 0.5% by weight sodium oxide to a temperature of about 1500° F. for about 3 hours in the substantial absence of steam to improve the selectivity and activity of the catalyst.

7. A process for revivifying a synthetic silica-alumina cracking catalyst contaminated in use which comprises heating a contaminated silica-alumina catalyst containing between about 0.05% and 0.5% by weight of calcium oxide to a temperature of about 1500° F. for about 3 hours in the substantial absence of steam to improve the selectivity and activity of the catalyst.

8. A process for restoring selectivity and activity to a cracking silica-alumina catalyst contaminated during cracking which comprises adding to said catalyst a small amount of alkaline material selected from the group consisting of alkali metal oxides and alkaline earth metal oxides so that the said catalyst will contain between about 0.05% and 0.5% by weight of said alkaline material and then heat treating the treated catalyst for about 1 to 3 hours at a temperature between about 1250° F. and 1750° F. in the substantial absence of steam.

9. A process for restoring selectivity and activity to a cracking silica-alumina catalyst contaminated during cracking which comprises adding a small amount of an alkali metal oxide to the contaminated catalyst so that the said catalyst will contain between about 0.05% and 0.5% by weight of the alkali metal oxide and then heat treating the treated catalyst for about 1 to 3 hours at a temperature between about 1250° F. and 1750° F. in the substantial absence of steam.

10. A process for restoring selectivity and activity to a synthetic silica-alumina gel catalyst contaminated during cracking which comprises adding a small amount of sodium oxide to the contaminated catalyst to bring the sodium oxide content of the catalyst to between about 0.05 and 0.5% by weight and then heat treating the so treated catalyst for about 1 to 3 hours at a temperature between about 1250° F. and 1750° F. in the substantial absence of steam.

11. A process for restoring selectivity and activity to a cracking silica-alumina catalyst contaminated during cracking which comprises adding a small amount of an alkaline earth metal oxide to the contaminated catalyst so that the said catalyst will contain between about 0.05% and 0.5% by weight of the alkaline earth metal oxide and then heat treating the treated catalyts for about 1 to 3 hours at a temperature between about 1250° F. and 1750° F. in the substantial absence of steam.

12. A process for restoring selectivity and activity to a cracking silica-alumina catalyst contaminated during cracking which comprises adding a small amount of calcium oxide to the contaminated catalyst so that the said catalyst will contain between about 0.05% and 0.5% by weight of calcium oxide and then heat treating the treated catalyst for about 1 to 3 hours at a temperature between about 1250° F. and 1750° F. in the substantial absence of steam.

13. In a process for the catalyst cracking of hydrocarbons to produce lower boiling hydrocarbons wherein silica-alumina catalyst particles containing between about 0.05% and 0.5% by weight of an inorganic alkaline metal oxide are circulated in a system between a regeneration zone maintained at a temperature between about 900° F. and 1150° F. and a cracking zone maintained at a temperature between about 850° F. and 1000° F. and the catalyst particles become contaminated during cracking after a period of use and the selectivity and the activity of the silica-alumina catalyst are reduced, the improvement which comprises withdrawing regenerated silica-alumina catalyst of reduced activity and selectivity from said regeneration zone and passing it to a heat treating zone, heating said withdrawn regenerated catalyst in said heat treating zone to a temperature between about 1250° F. and 1750° F. substantially at atmospheric pressure in the substantial absence of steam for about 1 to 3 hours, and then returning the so-heated catalyst from said heat treating zone to said regeneration zone.

14. A process according to claim 13 wherein the alkaline metal oxide comprises calcium oxide and the temperature of heating is 1500° F. for about 3 hours.

15. A process for the catalytic cracking of gas oil to form lower boiling hydrocarbons wherein finely divided silica-alumina catalyst containing between about 0.05% and 0.5% by weight of sodium oxide is circulated in a system between a regeneration zone and a cracking zone and the catalyst particles become contaminated during cracking after a period of use and the selectivity and activity of the catalyst are reduced, the improvement which comprises withdrawing catalyst of reduced activity and selectivity from said regeneration zone and passing it to a heat treating zone, heating said withdrawn catalyst in said heat treating zone to a temperature between about 1250° F. and 1750° F. substantially at atmospheric pressure in the substantial absence of steam for about 1 to 3 hours, and then returning the catalyst so heat-treated from said heat treating zone to said regeneration zone.

16. In a process for the catlaytic cracking of hydrocarbons to produce lower boiling hydrocarbons wherein silica-alumina catalyst particles containing between about 0.05% and 0.5% by weight of sodium oxide are circulated in a system between a regeneration zone maintained at a temperature between about 900° F. and 1150° F. and a cracking zone maintained at a temperature between about 850° F. and 1000° F. and the catalyst particles become contaminated during cracking after a period of use and the selectivity and the activity of the silica-alumina catalyst are reduced, the improvement which comprises withdrawing regenerated silica-alumina catalyst of reduced activity and selectivity from said regeneration zone and passing it to a heat treating zone, heating said withdrawn regenerated catalyst in said heat treating zone to a temperature of 1500° F. substantially at atmospheric pressure in the substantial absence of steam for about 3 hours, and then returning the so-heated catalyst from said heat treating zone to said regeneration zone.

17. In a process for the catalytic cracking of hydrocarbons to produce lower boiling hydrocarbons wherein silica-alumina catalyst particles containing between about 0.05% and 0.5% by weight of calcium oxide are circulated in a system between a regeneration zone maintained at a temperature between about 900° F. and 1150° F. and a cracking zone maintained at a temperature between about 850° F. and 1000° F. and the catalyst particles become contaminated during cracking after a period of use and the selectivity and the activity of the silica-alumina catalyst are reduced, the improvement which comprises withdrawing regenerated silica-alumina catalyst of reduced activity and selectivity from said regeneration zone and passing it to a heat treating zone, heating said withdrawn regenerated catalyst in said heat treating zone to a temperature between about 1250° F. and 1750° F. substantially at atmospheric pressure in the substantial absence of steam for about 1 to 3 hours, and then returning the so-heated catalyst from said heat treating zone to said regeneration zone.

References Cited in the file of this patent

UNITED STATES PATENTS

| | | |
|---|---|---|
| 2,518,354 | Meinert et al. | Aug. 8, 1950 |
| 2,749,287 | Kirshenbaum | June 5, 1956 |
| 2,742,405 | Mattox | Apr. 17, 1956 |
| 2,758,098 | Haensel | Aug. 7, 1956 |
| 2,762,752 | Hemminger | Sept. 11, 1956 |
| 2,769,687 | Porter et al. | Nov. 6, 1956 |

FOREIGN PATENTS

| | | |
|---|---|---|
| 668,996 | Great Britain | Mar. 26, 1952 |